No. 832,852. PATENTED OCT. 9, 1906.
W. MacN. FAIRFAX.
SYSTEM OF DISTRIBUTING ELECTRICITY BY ALTERNATING CURRENTS.
APPLICATION FILED JULY 18, 1892.
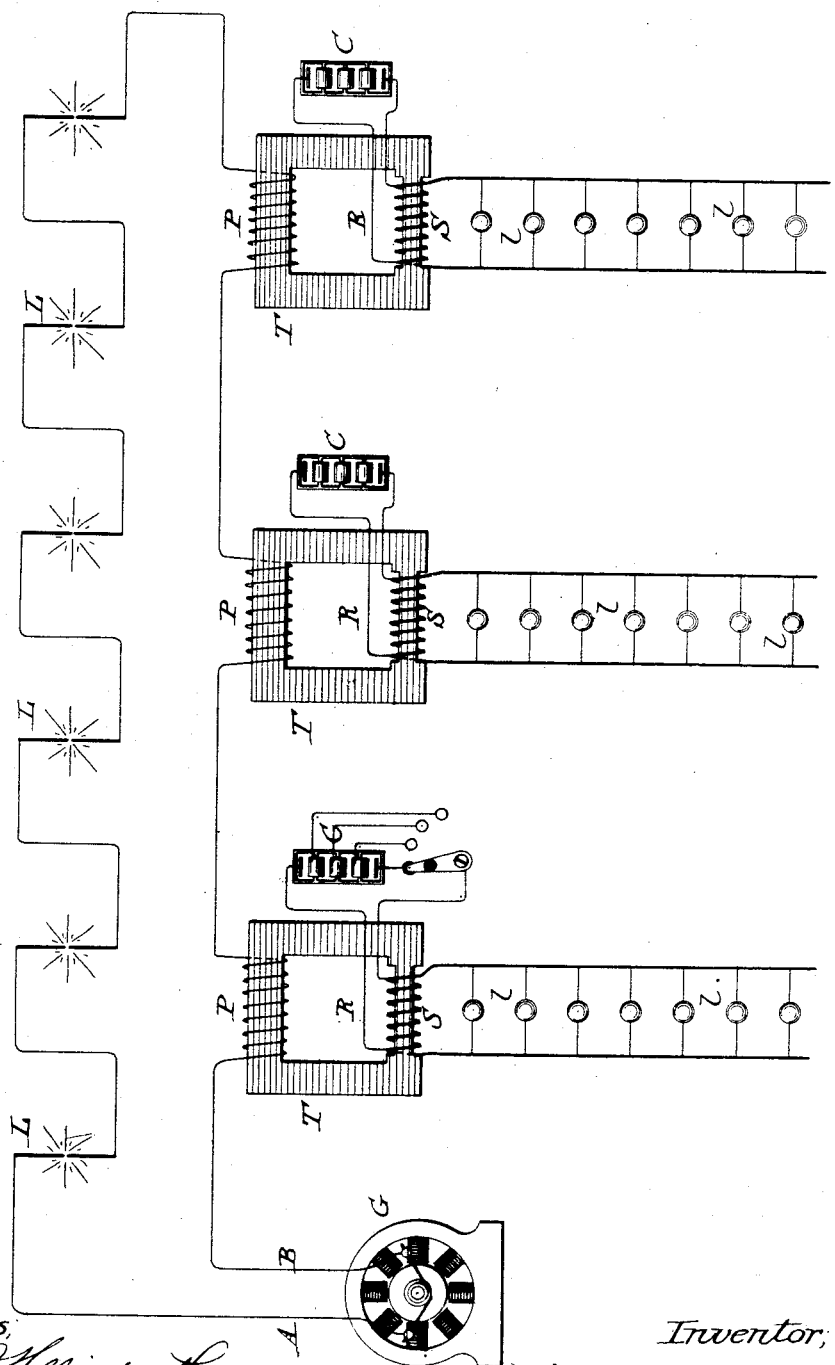

UNITED STATES PATENT OFFICE.

WILLIAM MacNEILL FAIRFAX, OF BROOKLYN, NEW YORK.

SYSTEM OF DISTRIBUTING ELECTRICITY BY ALTERNATING CURRENTS.

No. 832,852.　　　Specification of Letters Patent.　　Patented Oct. 9, 1906.

Application filed July 18, 1892. Serial No. 440,378.

*To all whom it may concern:*

Be it known that I, WILLIAM MACNEILL FAIRFAX, of the city of Brooklyn, county of Kings, and State of New York, have invented certain new and useful Improvements in Systems of Distributing Electricity by Alternating Currents, of which the following is a specification, reference being had to the accompanying drawing, forming part of this specification.

My invention has for its object the simplification and improvement of alternating-current systems; and my particular object is to arrange transformers in series on a constant-current alternating system.

It has hitherto been found impracticable to arrange converters in series when their secondaries supply translating devices in multiple arc, because in such case the primaries require currents of constant quantity and the secondaries currents of constant potential. I have found that by the use of condensers, preferably of the electrolytic type, connected with one of the circuits of a transformer I am enabled to so regulate the secondary current in relation to the primary current and the resultant magnetization of the core of the converter that the desired regulation of the converter is accomplished—that is, on a decrease of load on the secondary circuit by means of these regulating devices the respective currents and the resultant magnetization of the core of the transformer are so affected as to decrease in proper ratio the number of lines of force which thread through the core of the converter, thereby diminishing the total magnetization of the core and decreasing the pressure at the terminals of the primary circuit and the inductive resistance of the primary circuit. This regulates the transformers in the desired direction. The condensers accomplish the desired regulation, and hence the condensers alone or the condensers with other means may be used, and by a proper proportion of the parts used I can practically accomplish the wished-for regulation.

The figure is a diagrammatic sketch of a system containing my improvements.

Referring to the drawing, G is an alternating generator. A B is a line-circuit extending from said generator.

L L are arc-lamps or other translating devices arranged in series in the circuit A B.

T T are converters or transformers.

P P are the primary coils of the transformers.

S S are the secondary coils of the transformers.

1 1 are incandescent lamps or other translating devices arranged in multiple arc in the secondary circuits S S.

C C are condensers placed in shunt to the secondary circuit. As shown, connected in shunt to the secondary circuit are the terminals of the condenser. These condensers may be polariaztion or electrolytic cells.

The action of the apparatus shown in the drawing is as follows: When the load on the secondary is decreased—for instance, when lamps arranged in multiple arc are cut out—then the pressure at the terminals of the secondary circuit tends to rise. This in turn affects the pressure at the terminals of the condenser C. The action of the condenser appears to be that of a negative inductance—that is, the action of the condenser appears to be the opposite to the action of a self-induction coil, or at least the action of the condenser appears to be to so shift the time phases of the primary and secondary of the transformer as to cause them to be in the same direction for the greater part of a period of alternation, and this enables the transformers in a series arrangement to regulate in a right way, and it so varies the time phase of the secondary in relation to the primary and so affects the variations of the respective time phase as to vary the self-induction of the secondary, and consequently the primary currents, in approximately direct ratio to the variations of load on the secondary circuits.

By this simple and inexpensive means—namely, a phase-advancing device connected to the secondary circuit—I am enabled to arrange transformers in series having devices in their secondaries connected in multiple arc. The many advantages arising from this arrangement are obvious. Among others may be mentioned the possibility of arranging constant-current and constant-potential devices on the same circuit, the avoidance of large main line-wires, the absence of the necessity of using feeder-mains, thus avoiding much complication and expense.

In order that I may have means by which I can readily adjust the time phases of the respective currents, I have the plates of my condensers so arranged in their supports that they can be moved in relation to each other, thereby affecting the capacity of the condenser, or I may use means for cutting in and out a number of the condenser-plates.

I claim—

1. In a system of transmission and distribution of electricity the combination of a generator of alternating currents of constant quantity, means for supplying said currents to a plurality of transformers connected in series, secondary circuits supplied from said transformers containing translating devices, and means for maintaining the secondary voltage approximately constant by decreasing the self-inductive effect due to the magnetic circuit in each transformer.

2. The combination of a source of alternating currents of approximately constant quantity, a transformer supplied from said source, and a phase-advancing device connected to the secondary circuit of said transformer.

3. The combination of a source of alternating currents of approximately constant quantity, a circuit leading therefrom, a plurality of transformers arranged in series in said circuit, and a phase-advancing device connected to the secondary circuits of said transformers.

4. In a system of electrical transmission and distribution, the combination of an alternating-current generator supplying currents of approximately constant quantity, the line-circuit connected to said generator having arranged therein in series a number of transforming devices, each of said transforming devices having translating devices arranged in parallel in their secondary circuits, and a device having capacity arranged in shunt to the translating devices in said secondary circuit.

5. In a system of electrical transmission and distribution, the combination of an alternating-current generator supplying currents of approximately constant quantity, the line-circuit connected to said generator having arranged therein in series a number of transforming devices, each of said transforming devices having translating devices arranged in parallel in their secondary circuits, and an electrolytic condenser arranged in shunt to the translating devices in said secondary circuit.

6. In a system of electrical transmission and distribution, the combination of an alternating-current generator supplying currents of approximately constant quantity, the line-circuit connected to said generator having arranged therein in series a number of transforming devices, each of said transforming devices having translating devices arranged in parallel in their secondary circuits, and an electrolytic condenser of variable capacity arranged in shunt to the translating devices in said secondary circuit.

7. In a system of electrical distribution and transmission, the combination of an alternating-current generator supplying current of approximately constant quantity, a line-circuit connected to said generator, a plurality of transformers arranged in series in said circuit, and a regulable phase-advancing device connected with the secondary circuit of each one of the said transformers.

Signed at New York, in the county of New York and State of New York, this 16th day of July, A. D. 1892.

WILLIAM MACNEILL FAIRFAX.

Witnesses:
G. LAYMAN,
K. DWYER.